United States Patent [19]
Gilbert

[11] Patent Number: 5,492,414
[45] Date of Patent: Feb. 20, 1996

[54] LINEAR BALL SLIDE WITH RACK AND PINION

[75] Inventor: Steven J. Gilbert, Rochester, N.Y.

[73] Assignee: Automation Gages, Inc., Rochester, N.Y.

[21] Appl. No.: 463,917

[22] Filed: Jun. 5, 1995

[51] Int. Cl.$^6$ .................................................. F16C 29/04
[52] U.S. Cl. .................................................. 384/49; 384/25
[58] Field of Search .................................. 384/49, 25, 45

[56] References Cited

U.S. PATENT DOCUMENTS

| | | | |
|---|---|---|---|
| 3,113,807 | 12/1963 | Polidor | 384/49 |
| 4,334,717 | 6/1982 | Polidor | 384/49 |
| 4,648,725 | 3/1987 | Takahashi | 384/25 X |
| 4,712,890 | 12/1987 | Dobner | 384/49 X |
| 4,929,097 | 5/1990 | Mottate | 384/49 |
| 5,106,207 | 4/1992 | Fry | 384/49 |
| 5,314,254 | 5/1994 | Yashar et al. | 384/49 |
| 5,326,197 | 7/1994 | Takei | 384/45 X |
| 5,374,128 | 12/1994 | Herbeck | 384/49 |

*Primary Examiner*—Thomas R. Hannon
*Attorney, Agent, or Firm*—Shlesinger, Fitzsimmons & Shlesinger

[57] ABSTRACT

A male slide member, which is mounted to reciprocate in a rectangular recess formed in the face of a base member, is supported at one side thereof by a plurality of ball bearings for substantially friction-free movement with respect to one side of the recess, and is supported at its opposite side by an elongate bearing rod carried by the male slide member to have frictional, sliding movement with respect to a pair of spaced, parallel bearing surfaces that extend longitudinally of the other side of the recess in the base member. The bearing rod has formed in its periphery longitudinally spaced gear teeth which mesh with the teeth of a pinion gear mounted on the base member to rotate adjacent the bearing rod, and selectively to drive the rod and its attached slide member in opposite directions.

13 Claims, 2 Drawing Sheets

LINEAR BALL SLIDE WITH RACK AND PINION

BACKGROUND OF THE INVENTION

This invention relates to linear ball slides for use with precision instruments and the like, and more particularly to an improved such slide which includes a novel rack and pinion adjusting mechanism.

Ball slides of the type described normally comprise a generally rectangularly shaped base or female section having in its upper surface an elongate, generally rectangular groove which opens on opposite ends of the female member. A male slide member is mounted for reciprocable sliding movement in the groove in the female member by virtue of two sets of ball bearings, which are interposed between the opposed, longitudinal side edges of the male member, and the confronting side edges of the groove formed in the female member. Thus, the slide member is supported at opposite sides thereof by the two sets' of ball bearings for longitudinal sliding movement in the groove formed in the base member. By way of example, typical such linear ball slides are disclosed in U.S. Pat. Nos. 4,334,717, 3,113,807, 5,106,207 and 5,374,128, all of which patents are assigned to the same Assignee as the instant application.

A common feature of the above-noted prior art ball slides is the substantially friction-free connection provided by the two sets of ball bearings between the male slide member, and the female base member. This same frictionless mounting feature, however, often requires that the ball slide be connected to or be provided with a separate friction clutch or braking device, which will function to secure one member against movement relative to the other after the movable section of the slide has been adjusted into a desired position. For example, when one of the two members of a conventional ball slide is connected to a manually operated lens focusing mechanism which must be smoothly and accurately adjusted to a predetermined position, it is necessary, once such a position has been reached, to brake the movement of one member of the ball slide relative to the other so that the objective lens of the instrument will remain in the desired, focused position. The necessary intensity of this braking effect will of course vary depending upon the nature of the instrument manipulated by the slide, but obviously will be more critical for applications in which the adjustment of one slide member relative to the other is in the vertical direction.

It is an object of this invention, therefore, to provide a novel, modified ball slide having friction drive means for shifting one member of the slide relative to the other, and operative normally frictionally to resist relative movement between the two members of the slide.

A more specific object of this invention is to provide a modified linear ball slide in which one of the two members of the slide is supported at one side thereof by a series of ball or roller bearings, and at its opposite side by a cooperating rack and pinion mechanism which is operable to effect precise and smooth adjustment of one member of the slide relative to the other.

Still another object of this invention is to provide an improved, modified ball slide of the type described having friction means interposed between the two members of the slide, and operative frictionally to resist movement of one member of the slide relative to the other.

Other objects of this invention will be apparent hereinafter from the specification and from the recital of the appended claims, particularly when read in conjunction with the accompanying drawings.

SUMMARY OF THE INVENTION

The rectangularly shaped, adjustable male or slide member of a modified ball slide is mounted for reciprocation in a rectangular groove or slot formed in the upper surface of a female base member. The slide member is supported at one side thereof on the base member by a conventional set of ball or roller bearings, and at its opposite side by an elongate, cylindrical operating rod. This rod has diametral opposite sides thereof slidably supported by two pairs of spaced, parallel bearing rods seated, respectively, in confronting grooves formed in said opposite side of the slide member, and the confronting side of the groove in the base member.

To effect adjustment of the slide member on the base member, the cylindrical operating rod has longitudinally spaced gear teeth formed in the diametral side thereof that faces the confronting side of the groove in the base member. These teeth, which operatively form a rack along one side of the operating rod, mesh with a pinion gear which is mounted at the adjacent side of the base member medially of its ends to rotate about an axis extending normal to the axis of the operating rod. The pinion is rotatable selectively in opposite directions by conventioanl means to shift the slide member selectively in opposite directions on the base member, and against the frictional resistance to movement of the slide member created by the sliding engagment of the operating rod with the two pairs of bearing rods engaged therewith.

THE DRAWINGS

DETAILED DESCRIPTION OF THE PREFERRED EMBODIMENTS

Figure 1:
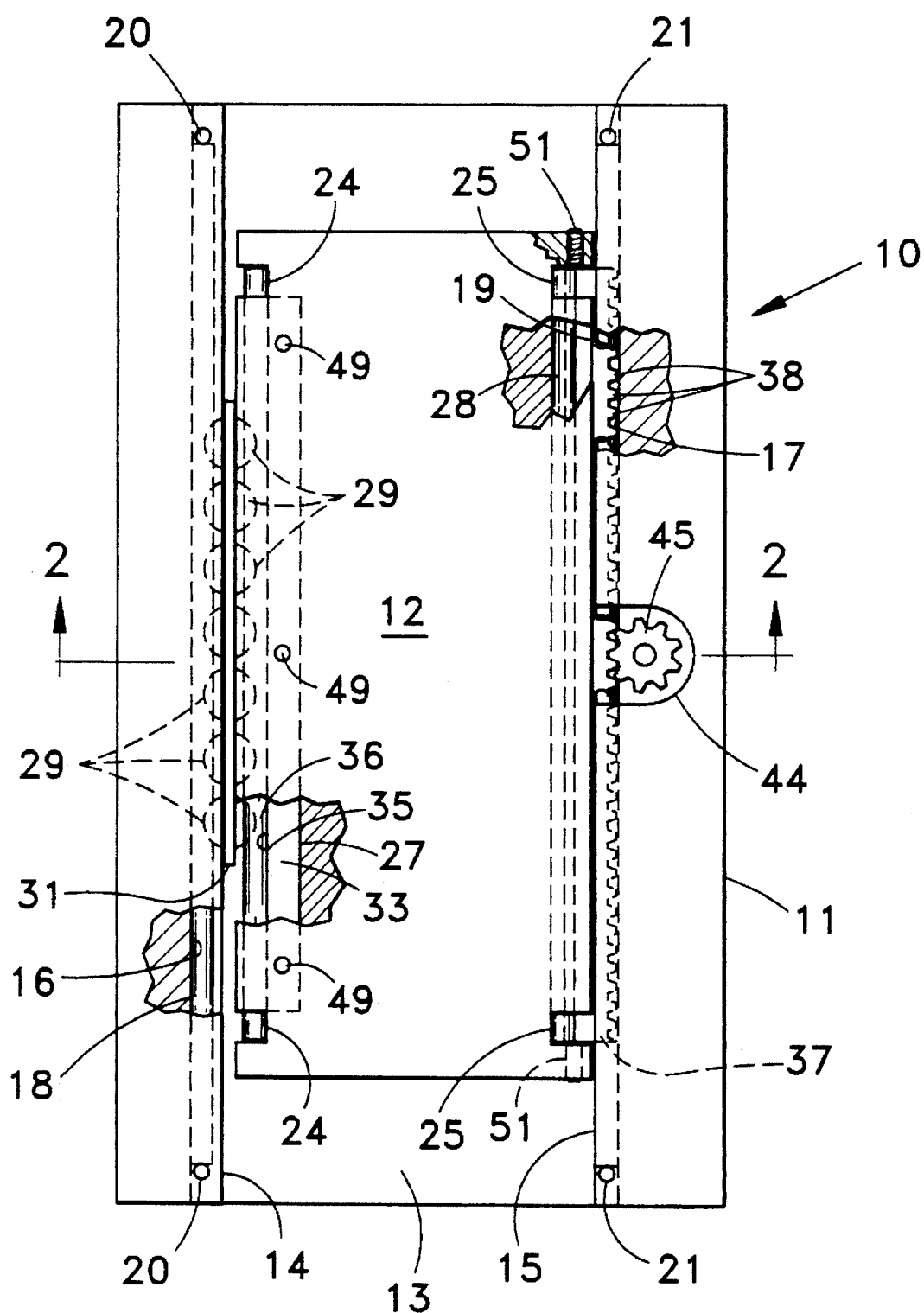
FIG. 1 is a plan view of a modified linear ball slide made according to one embodiment of this invention, portions of the two members of the slide being broken away and shown in section for purposes of illustration.

Referring now to the drawings by numerals of reference, and first to FIGS. 1 to 3, 10 denotes generally a modified ball slide comprising two principal parts or members—namely, an elongate, rectangularly-shaped base member 11, and a rectangularly-shaped slide member 12 which is mounted for longitudinal sliding movement in a rectangularly-shaped groove 13 formed centrally in the upper surface of base member 11. Opposite sides of the groove 13, which has a depth approximately equal to the thickness of the slide member 12, are defined by a pair of spaced, parallel longitudinally extending surfaces 14 and 15 on the base member 11. Centrally thereof the surfaces 14 and 15 have formed therein elongate, rectangularly-shaped recesses or grooves 16 and 17, respectively, which extend in spaced, parallel confronting relation to each other between opposite ends of member 11, and parallel to its groove 13. Removably seated in a conventional manner in the two inside corners of the grooves 16 and 17 are two, elongate, cylindrically-shaped bearing rods 18 and 19, respectively. The bearing rods 18 and 19 of each pair thereof are slightly shorter than the overall length of the base member 11, and are secured in a conventional manner against axial sliding movement in their respective grooves 16 and 17 by two sets of pins 20 and 21. Pins 20 and 21 are secured, for example by press fit, in vertical openings formed in the base member 11 adjacent opposite ends of its grooves 16 and 17, respectively and in such manner that they extend transversely across opposite ends of the associated bearing rods 18 and 19, respectively.

The slide member 12, which is substantially shorter than the base member 11, and slightly narrower than the width of the groove 13 in which it slides, has formed in each side thereof a pair of longtitudinally spaced, transversely extending slots or grooves 24 and 25, respectively. The slots of each pair 24 and 25 thereof are slightly spaced longitudinally inwardly from opposite ends of the member 12 and confront upon, and extend transversely of, the grooves 16 and 17, respectively, in member 11. Member 12 also has in opposite sides thereof elongate, longitudinally extending grooves 27 and 26, opposite ends of which open upon the slots 24 and 25, respectively. Thus, unlike the grooves 16 and 17 in member 11, the grooves 26 and 27 do not open on opposite ends of the member 12.

Figure 2:
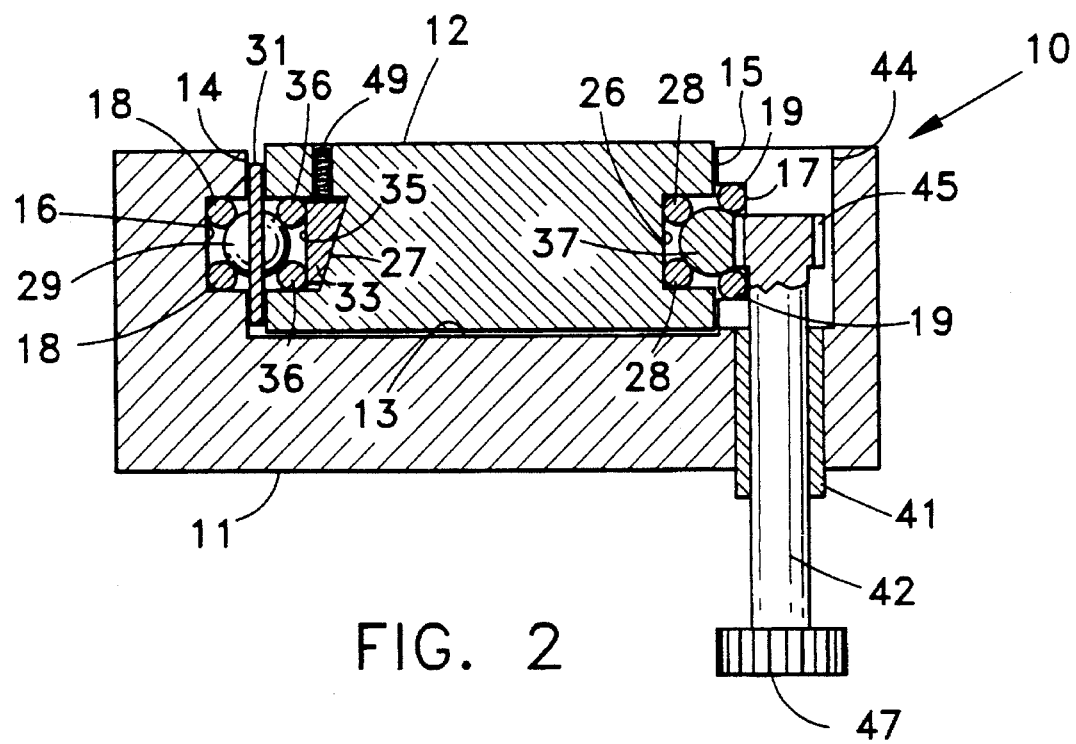
FIG. 2 is a sectional view taken generally along the line 2—2 in FIG. 1 looking in the direction of the arrows.

As shown in FIG. 2, groove 27 confronts upon and has a cross sectional configuration different from the rectangular configuration of the groove 16 in the base member 11. More specifically, the inner end or bottom of groove 27, as shown for example in FIG. 2, is inclined slightly to the parallel planes containing the upper and lower surfaces of slide member 12. Adjustably mounted at the bottom of groove 27 is a tapered gib 33, which may be of the type disclosed, for example, in the above-noted U.S. Pat. No. 4,334,717. This gib 33, the lower end of which is spaced slightly above the lower side of the groove 27 as shown in FIG. 2, has a plane, outer surface 35, which is engaged with one diametral side of each of two spaced, parallel bearing rods 36, which are mounted in groove 27 to extend longitudinally thereof, and which at opposite ends thereof project into the slots 24. Interposed between the two sets of bearing rods 18 and 36 to have rolling engagement therewith is a series of ball bearings 29, which are mounted in the conventional mannner in an elongate, rectangularly-shaped keeper plate 31. Plate 31 is thus supported by the ball bearings 29 for longitudinal sliding movement between the confronting surfaces of the members 11 and 12 which contain the grooves 16 and 27, respectively. One side of the slide member 12 (the left side thereof as shown in FIGS. 1 and 2 and is thus supported in a conventional manner by roller bearings for substantially friction-free longitudinal sliding movement relative to the base member 11.

Referring again to FIG. 2, it will be observed that the elongate groove 26, which is formed in the slide member 12 opposite to the groove 27, is substantially a mirror image of the confronting groove 17 in member 11. Also like groove 17, the groove 26 has removably mounted in the inside corners thereof a pair of elongate, cylindrically-shaped bearing rods 28, opposite ends of which extend into the slots 25, the outermost sidewalls of which overlie opposite ends of the rods 28 to Prevent any axial shifting thereof in the groove 26. The bearing rods 28 have sliding, tangential engagement with the outer peripheral surface of an elongate, cylindrical operating rod 37, which is larger in diameter than the rods 28. Rod 37 extends longitudinally of the groove 26 in member 12, and at opposite ends thereof extends into the transverse slots 25 in member 12. Thus, like rods 28, the rod 37 is held against axial movement in the groove 26 by the overlying side walls of slots 25.

Figure 3:
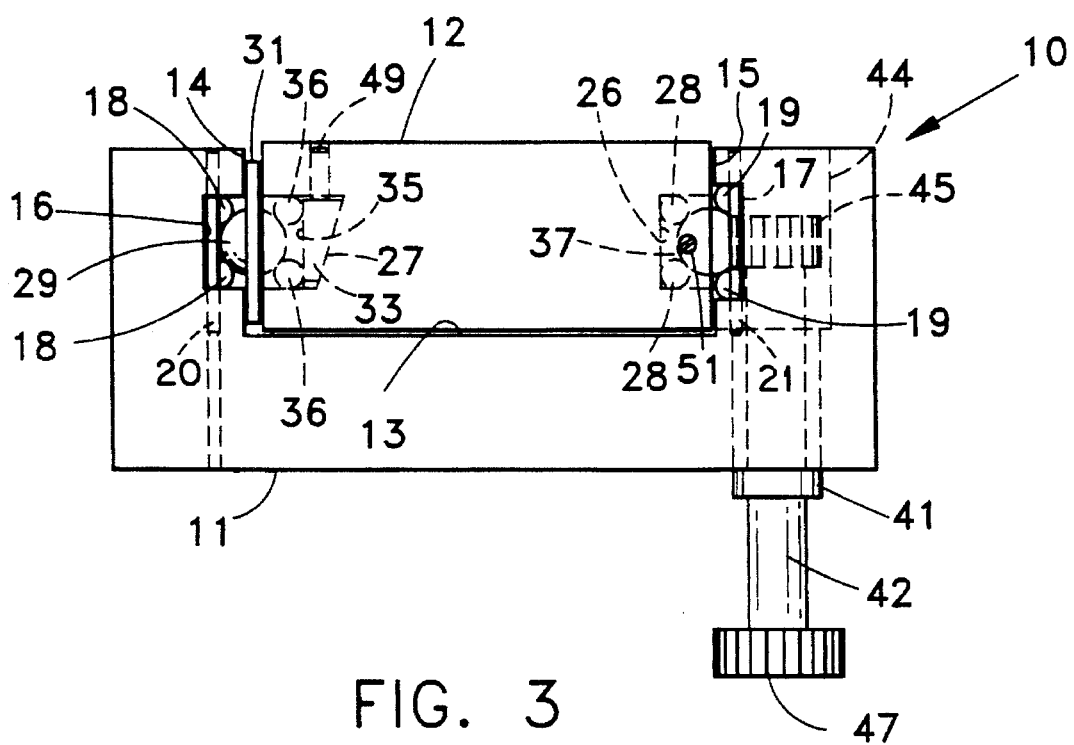
FIG. 3 is an end elevational view of this modified slide as seen when looking at the lower end of the slide as shown in FIG. 1.

Also as shown more clearly in FIGS. 2 and 3, approximately one diametral half of the rod 37 extends into groove 26, where its outer peripheral surface is engaged at angularly spaced points therealong by the two bearing rods 28. Substantially the other diametral half of rod 37 projects into the groove 17 in the base plate 11 so as to have tangential engagement with the two bearing rods 19 that are seated in groove 17. Thus the slide member 12 is supported at one side thereof by the ball bearings 29, and at its opposite side by the operating rod 37, the outer peripheral surface of which has sliding, tangential engagement with the four bearing rods 28 and 19 at angularly spaced points around the periphery of the rod 37.

To effect frictional movement of the slide member 12 relative to the base member 11, the rod 37 has formed on that portion of its outer peripheral surface which registers with the space between the bearing rods 19, a plurality of longitudinally spaced gear teeth 38, which operatively form on the rod 37 an elongate rack. Rotatably mounted intermediate its ends in a sleeve bearing 41, which is secured in an opening formed in the base member adjacent one side thereof (the right-hand side as shown in FIGS. 1 and 2), and with the axis thereof extending normal to the path of travel of the slide member 12, is a drive shaft 42. Shaft 42 projects at its upper end (FIG. 2) coaxially into a generally U-shaped recess or notch 44, which is formed in the surface 15 of base member 11 approximately medially of its ends. Secured to the upper end of shaft 42 for rotation thereby in the recess 44 is a pinion gear 45, the teeth of which have meshing engagement with the rack teeth 38 on rod 37. Shaft 42 is adapted to be rotated selectively in opposite directions by any conventional means, such as for example manually by a knurled nob 47, which is secured to shaft 42 externally of the slide 10. When shaft 42 is rotated in one direction its pinion gear 45 causes the meshing rack that is formed on rod 37 to shift the rod, and hence slide member 12 in one direction. Conversely, when the shaft 42 is rotated in the opposite direction the gear drive between pinion 45 and the rack teeth 38 will cause the slide 12 to be shifted in the opposite direction relative to member 11. The linear movement of slide member 12 on base member 11 is limited by the vertical pins 21, which register with opposite ends of the diametral portion of rod 37 that projects into the space between rods 19. Whenever the slide 12 has been shifted into a predetermined position relative to the base member 11, the slide will tend to remain in that position because of the friction that must be overcome in order for the slide member 12 to impart motion rearwardly toward the gear shaft 42. Likewise, in order for the shaft 42 to effect movement of the slide member 12 on member 11, the shaft 42 must also be rotated with sufficient force to overcome any friction that exists in the rack and pinion drive mechanism for slide 12.

If it is desired to increase the friction that resists movement of the slide member 12 relative to the base member 11, the tapered wedge or gib 33 may be shifted slightly downwardly from its position as shown in FIG. 2 by rotatably adjusting the series of adjusting screws 49, which are threadable in openings formed in the upper surface of the slide member 12 for engagement at their inner ends with the upper surface of the gib 33. Screws 49 can thus be adjusted either to increase or decrease the force exerted by the gib 33 laterally against the two bearing rods 28, and hence the force with which the rod 37 is urged against the rods 19 and the teeth on the pinion 45. Also, to prevent rod 37 from becoming dislodged from groove 26, screws 51 may be threaded through opposite ends of slide 12 and into opposite ends of rod 37.

From the foregoing it will apparent that the present invention provides a relatively simple but very effective modified ball slide, which is particularly suitable for use in connection with the adjustment of instruments that must be retained rather securely in a selected position, once having been adjusted into that position by the associated drive mechanism. The side of the slide member 12 which is supported by the ball bearings 29 is essentially free of any friction, while the opposite side of the slide member, which is supported by the cylindrical rack member 37 and associated bearing rods 19 and 28, is nearly free of friction but for the friction which is developed between the rack and pinion drive that is associated with the slide. The rod 37 has minimal sliding contact with the four bearing rods 19 and 28, by virtue of the fact that it has only linear sliding engagement with those rods at four angularly-spaced points around its axis. While this sliding movement introduces some frictional resistance to the movement of member 12 relative to member 11, there likewise is additional friction resistance introduced by the associated gear drive.

A primary advantage of this construction is that the force required to move the slide 12 relative to member 14 is applied to the rack on rod 37, which also happens to be the source of the friction when, upon adjustment of the slide 12, the rod 37 slides on the bearing rods 19 and 28. As a consequence, force supplied by the pinion 45 to rod 37 is in alignment with, and in close proximity to, the friction created by movement of the rod 37, and as a consequence the drive mechanism permits very accurate and precise motion to be imparted to the slide member 12 without introducing into the drive mechanism any stresses which might otherwise create slight inaccuracies in the adjustment of slide 12. Likewise, the frictional force which tends to resist movement of the slide 12 is applied directly to the slide itself, rather than to some other driving component which would have to be connected via one or more additional components to the slide member 12, and which therefore would not result in as accurate adjustment of the slide.

While this invention has been illustrated and described in detail in connection with only certain embodiments thereof, it will be apparent that it is capable of still further modification. For example, instead of using the tapered gib 33 for adjusting the friction in the slide, other forms of pre-load adjusting mechanisms could be employed without departing from this invention, such as for example the adjusting mechanism disclosed in U.S. Pat. No. 3,113,807. Likewise, although ball bearings are employed to support one side of a slide member 12, it will be apparent to one skilled in the art that roller bearings could be employed without departing from this invention. Also, of course, the rotation of shaft 42, and hence that of the pinion 45, may be effected by any conventional means other than the manually operated knob 47, as described in the embodiment disclosed herein. It will be apparent also that this application is intended to cover any such modifications as may fall within the scope of the one skilled in the art, or the appended claims.

I claim:

1. A modified linear ball slide, comprising an elongate base member having formed in one surface thereof an elongate, rectangularly shaped groove, a slide member mounted for longitudinal sliding movement in said groove between opposite sides thereof, and having opposed, longitudinally extending side edges disposed in spaced confronting relation to said opposite sides of said groove in said base member, a plurality of spaced bearings interposed between and disposed to have rolling engagement with respect to one of said side edges of said slide member, and with respect to the side of said groove confronting upon said one side edge, upon movement of said slide member in said groove, an elongate operating element mounted on the other side edge of said slide member for movement therewith, and confronting upon and disposed to have longitudinal sliding movement with respect to the other side of said groove upon movement of said slide member, and drive means connected to said operating element and operable selectively to effect simultaneous movement of said operating element and said slide member in said groove.

2. A modified ball slide as defined in claim 1, wherein said operating element has a plurality of gear teeth formed thereon in spaced relation to each other longitudinally of said operating member, and said drive means comprises a pinion gear rotatably mounted on said base member for rotation selectively in opposite directions, and having the teeth thereof meshing with said teeth on said operating element to effect movement thereof upon rotation of said pinion gear.

3. A modified ball slide as defined in claim 1, wherein said other side of said groove has therein an elongate recess extending longitudinally thereof, two elongate cylindrical bearing rods are seated in and extend longitudinally of said recess in spaced, parallel relation to each other, and said operating element is a cylindrical element the outer peripheral surface of which extends parallel to and is urged into engagement with the peripheral surface of said bearing rods to have sliding contact therewith upon movement of said slide member in said grooves.

4. A modified linear ball slide as defined in claim 3, including means on one of said members adjustable selectively to increase or decrease the pressure with which said operating element is urged into engagement with said bearing rods.

5. A modified linear ball slide as defined in claim 3, wherein said operating element has a plurality of longitudinally spaced gear teeth formed in said outer peripheral surface thereof to register with the space between said bearing rods, and said drive means comprises a pinion gear mounted on said base member for rotation selectively in opposite directions about an axis extending transversely of the length of said operating element, and having the teeth thereof meshing with the teeth on said operating element.

6. A modified linear ball slide, comprising a first member having in one surface thereof an elongate rectangular recess, a second member mounted in said recess for movement relative to said first member in a direction longitudinally of said recess, and having thereon opposed side edges disposed in spaced, confronting relation to opposite sides of said recess in said first member, a plurality of rotatable bearings interposed between one side of said recess and the confronting side edge of said second member, and operative to support one side of said second member for substantially friction-free movement relative to said first member, means interposed between the other side edge of second member and the other side of said recess and operative to support the other side of said second member for frictional sliding movement relative to said first member, said means comprising an elongate bearing element secured to one of said members to extend longitudinally of, and to confront upon, the space between said other side of said recess and the other side edge of said second member, and disposed to have frictional sliding contact with respect to the other of said members upon relative movement between said members, and drive means on said other member drivingly connected to said one member and operable to effect relative movement between said members.

7. A modified linear ball slide as defined in claim 6 wherein said bearing element is secured to and extends longitudinally of said other side edge of said second member.

8. A modified linear ball slide as defined in claim 7, wherein said bearing element has thereon a plurality of gear teeth equi-spaced from each other longitudinally of said element, and said drive means comprises a pinion gear mounted to rotate on said first member and having the gear teeth thereof meshing with said gear teeth on said element.

9. A modified linear ball slide as defined in claim 6, wherein said other member has therein an elongate groove registering with and confronting upon said bearing element, two, elongate cylindrical bearing rods are seated in and extend longitudinally of said groove in spaced, parallel relation to each other, and said bearing element has thereon an elongate arcuate surface portions of which have frictional sliding contact with said bearing rods upon relative movement between said members.

10. A modified linear ball slide as defined in claim 9, including means operatively interposed between said members and adjustable selectively to increase or decrease the force with which said portions of the arcuate surface on said bearing element are urged into contact with said bearing rods.

11. A modified ball slide as defined in claim 6, wherein said drive means comprises a pinion gear mounted to rotate on said other member, and said one member has fixed thereon a rack comprising a plurality of gear teeth equi-spaced from each other in the longitudinal direction of said recess, and meshing with the teeth of said pinion to effect relative movement between said members upon rotation of said pinion.

12. A modified ball slide as defined in claim 11, wherein said gear teeth of said rack are formed on said bearing element.

13. A modified ball slide as defined in claim 12, wherein said bearing element is a cylindrical rod secured to and extending longitudinally of said other side edge of said second member, angularly spaced portions of the outer peripheral surface of said rod are disposed to have tangential sliding engagement with registering bearing surfaces that extend longitudinally of said other side of said recess in said first member, when said members are moved relative to each other, and said gear teeth on said bearing element register with the angular space between said angularly spaced portions of its outer peripheral surface.

* * * * *